(12) United States Patent
Major et al.

(10) Patent No.: US 10,960,446 B2
(45) Date of Patent: Mar. 30, 2021

(54) METHOD FOR THE DESTRUCTION OF ORGANIC CONTAMINANTS THROUGH SMOLDERING COMBUSTION

(71) Applicant: Geosyntec Consultants, Inc., Boca Raton, FL (US)

(72) Inventors: David Major, Guelph (CA); Gavin Grant, Etabicoke (CA); Grant Scholes, Guelph (CA); Jason Gerhard, London (CA)

(73) Assignee: Geosyntec Consultants, Inc., Boca Raton, FL (US)

( * ) Notice: Subject to any disclaimer, the term of this patent is extended or adjusted under 35 U.S.C. 154(b) by 0 days.

(21) Appl. No.: 16/394,245

(22) Filed: Apr. 25, 2019

(65) Prior Publication Data
US 2019/0329306 A1 Oct. 31, 2019

Related U.S. Application Data

(60) Provisional application No. 62/663,355, filed on Apr. 27, 2018.

(51) Int. Cl.
*B09C 1/00* (2006.01)
*B09C 1/06* (2006.01)

(52) U.S. Cl.
CPC .............. *B09C 1/00* (2013.01); *B09C 1/065* (2013.01); *B09C 2101/00* (2013.01)

(58) Field of Classification Search
CPC ....................................................... B09C 1/00
See application file for complete search history.

(56) References Cited

U.S. PATENT DOCUMENTS

| 8,132,987 B2* | 3/2012 | Gerhard | F23G 7/14 |
|---|---|---|---|
| | | | 405/128.85 |
| 9,259,770 B2* | 2/2016 | Thomas | F23G 5/50 |
| 2012/0272878 A1 | 11/2012 | Grant et al. | |
| 2012/0288332 A1 | 11/2012 | Thomas et al. | |
| 2013/0310624 A1 | 11/2013 | Thomas et al. | |
| 2014/0241806 A1* | 8/2014 | Rockwell | B09C 1/06 |
| | | | 405/128.6 |

OTHER PUBLICATIONS

International Searching Authority—International Search Report—International Application No. PCT/US2019/029071 dated Aug. 16, 2019, together with the Written Opinion of the International Searching Authority, 10 pages.

* cited by examiner

*Primary Examiner* — Janine M Kreck
(74) *Attorney, Agent, or Firm* — Sunstein LLP

(57) ABSTRACT

A method for remediating contaminated soil and groundwater includes selecting a treatment material and creating a smolderable mixture of a contaminant, the treatment material, and soil.

22 Claims, 10 Drawing Sheets

METHOD FOR THE DESTRUCTION OF ORGANIC CONTAMINANTS THROUGH SMOLDERING COMBUSTION

CROSS-REFERENCE TO RELATED APPLICATIONS

This patent application claims the benefit of U.S. Provisional Patent Application 62/663,355 filed Apr. 27, 2018, the disclosure of which is incorporated by reference herein in its entirety.

TECHNICAL FIELD

The present invention relates to methods for the destruction of organic contaminants through smoldering combustion, including the in situ and ex situ mixing of a porous matrix and organic treatment materials to facilitate the smoldering combustion process.

BACKGROUND ART

Smoldering combustion, when applied for the remediation of contaminated soils, is known commercially as the Self-sustaining Treatment for Active Remediation (STAR) technology and is the subject of U.S. Pat. No. 8,132,987.

Smoldering combustion requires a short duration energy input, and the addition of an oxidant (e.g., oxygen, air, etc.), to initiate and sustain the smoldering combustion reaction. Smoldering combustion is only possible in the presence of a fuel source and a porous matrix. A common example of a smoldering combustion reaction is that of a burning charcoal briquette where the charcoal is both the fuel and the porous matrix. For the STAR process, however, the fuel is the organic contaminant and the porous matrix is the subterranean volume of soil undergoing remediation.

Smoldering combustion of the organic contaminant may be self-sustaining in that it may only be necessary to supply sufficient energy to ignite the material; once ignited, combustion of the material may proceed as long as there is sufficient fuel (the combustible material) and oxygen for combustion to take place. This is in contrast with, for example, known thermal remediation processes, which require continuous energy input.

If sufficient fuel is not present (i.e., the contaminant concentration or saturation in soil is too low to support a self-sustaining combustion reaction), a surrogate fuel may be added to the fuel/porous matrix mixture as described for the ex situ treatment of soils and liquid organic wastes patent "Method for Volumetric Reduction of and Organic Liquid" (Australian Patent Number 2012249643). This process is known commercially as ex situ Self-sustaining Treatment for Active Remediation (STARx)

There are a variety of organic contaminants that are resistant to complete destruction by chemical, biological, or other means. Examples of recalcitrant compounds include per- and polyfluoroalkyl substances (PFAS), dioxins, and polychlorinated biphenyls (PCBs). These types of recalcitrant compounds, however, may be amenable to destruction via smoldering combustion or decomposition at elevated temperatures.

In the field of groundwater and soil remediation, there are many in situ techniques available to capture and treat recalcitrant organic contaminants in groundwater and soil. One technique is the use of Permeable Reactive Barriers (PRBs) that destroy, detoxify, collect or immobilize dissolved contaminants in groundwater as it flows through the PRB. The treatment materials used in PRBs may: (1) chemically react with dissolved contaminants (e.g., zero-valent metals), (2) adsorb dissolved contaminants (e.g., charcoal, activated carbon, resins, polymers); and/or (3) enhance the biological degradation processes of the dissolved contaminants (e.g., vegetable oil acting as an electron donor for reductive processes). A PRB can be 100% of the selected treatment material or mixed with soils or other permeable materials for construction or performance purposes. PRBs can also be composed of mixtures of treatment materials.

Treatment materials can also be added directly to the source zone of contaminants so that treatment can begin immediately upon application of the treatment materials rather than rely on the transport of contaminants to the location of the PRB. The treatment materials used in source zones can be the same or similar materials to those used in PRBs to cause chemical reaction, adsorption or biodegradation processes, but may also include clays or cements.

Some common treatment materials are organic and therefore combustible, such as vegetable oil or granular activated carbon. These organic treatment materials can be smoldered in a self-sustaining reaction and are common fuel surrogates for the ex situ destruction of organic contaminants via STARx. When these organic treatment materials are used in a PRB, low concentration or recalcitrant contaminants, such as PFAS compounds dissolved in groundwater and accumulating in the PRB, can be destroyed (i.e., thermally decomposed) through the in situ or ex situ smoldering combustion of the mixture of the contaminant, organic treatment material, and/or soils or other permeable construction material. Likewise, when these organic treatment materials are mixed into contaminant source zones, destruction (i.e., thermal decomposition) of the contaminant can take place through the smoldering combustion of the mixture of contaminant, organic treatment material, and/or soils or other permeable construction material.

SUMMARY OF THE EMBODIMENTS

In accordance with one embodiment of the invention, a method for remediating contaminated soil and groundwater includes selecting an organic treatment material and creating a smolderable mixture of a contaminant, the organic treatment material, and soil. The methods also heats a portion of the smolderable mixture, forces oxidant through the smolderable mixture to initiate a self-sustaining smoldering combustion of the smolderable mixture to destroy or remove the contaminant, and terminates the source of heat applied to the smolderable mixture. The method may propagate the combustion away from the point of ignition of the combustion.

Contaminants that can be treated by the method include but are not limited to perfluoroalkyl substances, polyfluoroalkyl substances, dioxins, polychlorinated biphenyl compounds, pesticides, herbicides, volatile organic compounds (VOCs), and semi-volatile organic compounds (SVOCs), and combinations of these and other contaminants.

The organic treatment material may be vegetable oil, hydrocarbons, tar, activated carbon, coal, charcoal, polymers, surfactants, woodchips and combinations thereof. The organic treatment material may be admixed below the ground to form a smolderable mixture using a variety of methods such as trenching, large diameter auger, excavation, caisson, injection, jetting, fracking, vibrating beam, tremmie, soil mixing and combinations thereof. The organic treatment material may be a liquid, a slurry, or a solid. The smolderable mixture thus formed may be smoldered below ground, or may be removed and smoldered above ground.

The organic treatment material may also be mixed above ground with soil containing the contaminant to form a smolderable mixture for smoldering above ground.

In some embodiments, the smolderable mixture may be part of a permeable reactive barrier that intersects the groundwater that contains the contaminants. The smolderable mixture may absorb and concentrate the contaminants, allowing for the removal of the contaminants from groundwater and thereafter the destruction or removal of the contaminants by smoldering. The soil containing the contaminants may be mixed below ground with the organic treatment material to create a smolderable mixture. The smolderable mixture may be combusted in place or removed and combusted above the ground. Alternatively, the soil trapped in the permeable reactive barrier containing the concentrated contaminant may be removed, mixed with organic treatment material above ground, and smoldered above ground.

As a means to initiate smoldering at lower temperatures, and as a means to propagate smoldering, oxidant may be forced through the smolderable mixture by injecting air into the smolderable mixture through one or more injection ports and/or by creating a vacuum to suck oxidant through the smolderable mixture. The oxidant may be forced through the smolderable mixture at a linear velocity of between 0.0001 and 100 centimetres per second.

A self-sustaining smoldering combustion may be achieved by applying heat to the smolderable mixture from at least one internal conductive heating source in direct contact with the smolderable mixture, or at least one convective heating source coupled to the smolderable mixture. The convective heating source coupled to the smolderable mixture may be external to the mixture or located within the smolderable mixture. A self-sustaining smoldering combustion may be also be achieved by applying radiative heat to the smolderable mixture. Smoldering combustion may be performed at a temperature within a range between 200 and 2000 degrees Celsius.

In an embodiment of the invention there is provided a method for emplacing the organic treatment material in a manner that forms a smolderable mixture below ground that can trap (e.g., absorbs) dissolved contaminants and/or that can encapsulate the volume of soil that contains contaminants.

In other embodiments, the smolderable mixture makes up a PRB that intersects the groundwater containing the dissolved contaminants.

In other embodiments, the volume of soil containing the contaminants is mixed with organic treatment material to create a smolderable mixture. This mixing can take place below ground or above ground, and smoldering can occur below ground or above ground.

In other embodiments, the smolderable mixture absorbs and concentrates the contaminants allowing their removal from water and thereafter their destruction or removal by smoldering.

In other embodiments, the absorption and concentration of the contaminants facilitates the smoldering combustion process of the smoldering mixture.

In other embodiments, the combustion of the smolderable mixture creates temperatures that destroy or remove contaminants within the smolderable mixture.

In other embodiments, after combustion, additional organic treatment material can be added to the PRB or the volume of soil containing the contaminants for additional treatment.

In other embodiments the organic treatment material can be added to a PRB or source below the ground using a variety of methods, for example, trenching, large diameter auger, excavation, caisson, injection, jetting, fracking, vibrating beam, tremmie, and soil mixing. The smolderable mixture can be created above ground and emplaced below ground by the variety of methods or can be emplaced and mixed directly below ground.

In other embodiments, the smolderable mixture can be combusted in place (i.e., in situ).

In other embodiments, the smolderable mixture can be removed and smoldered above ground (i.e., ex situ). A smolderable mixture can also be formed by removing soil containing contaminants, mixing this soil above ground with organic treatment material, to create a smolderable mixture for smoldering above ground.

In general terms, in each of the above described embodiments, it is desired to create a smolderable mixture through the addition of an organic treatment material and promote/maintain self-sustained smoldering combustion of the smolderable mixture as a method to destroy or remove the contaminant(s) in the PRB or in the volume of soil containing the contaminants.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
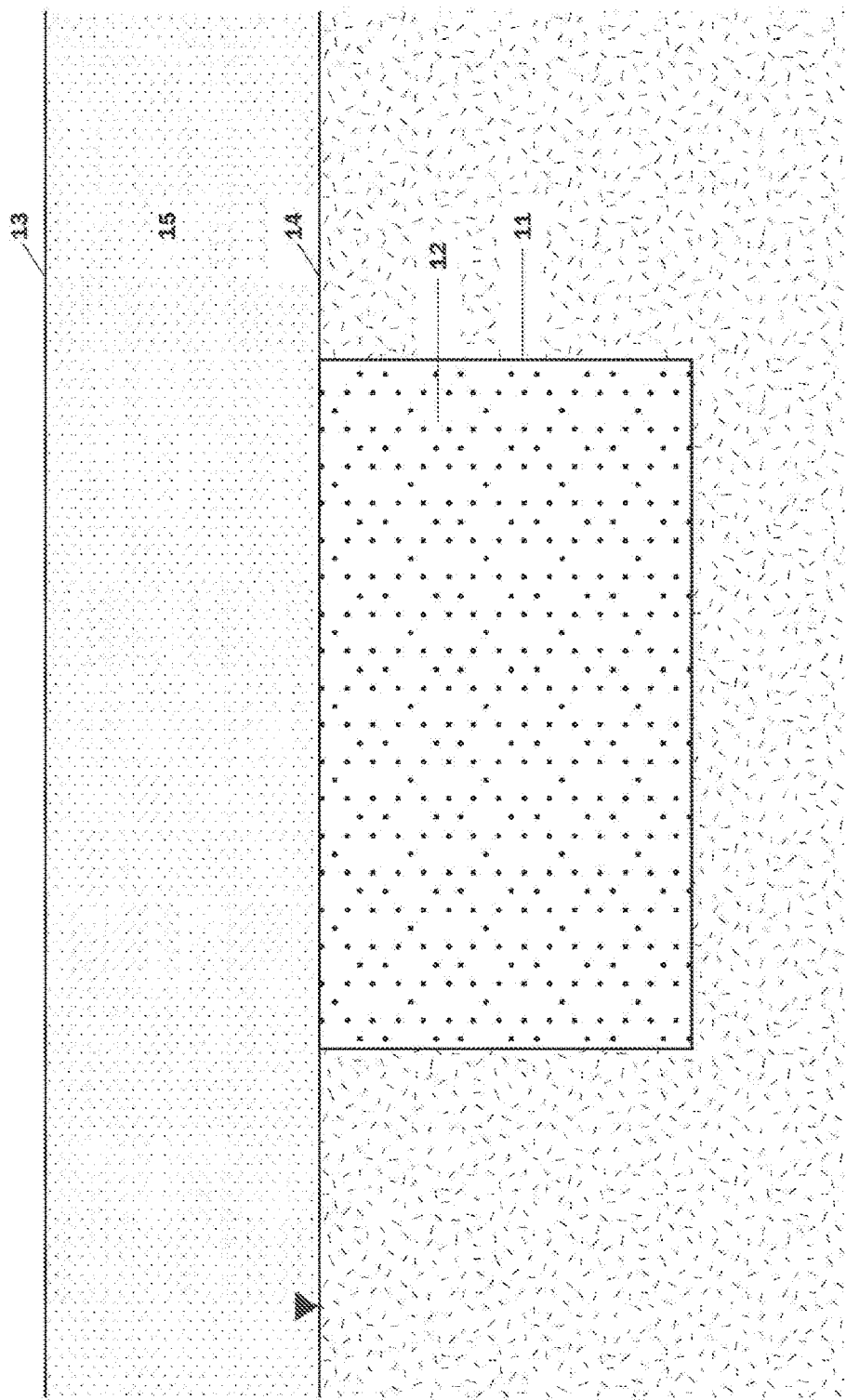
FIG. 1 is a schematic cross-sectional view of a prior art PRB that contains a smolderable mixture of contaminants, organic treatment material and porous matrix material.

Embodiments described herein rely on the principles of self-sustained smoldering combustion for the remediation of soil and groundwater contaminants which provides benefits over currently available groundwater and soil remediation techniques for contaminants that are considered recalcitrant but can typically be destroyed at temperatures above 250° C. In one embodiment, a smolderable mixture is formed from mixing an organic treatment material (e.g., activated carbon, charcoal, vegetable oil, polymers, surfactants alone or in combination), that in itself may or may not be porous, a porous matrix (e.g., soil, sand), and a contaminant (either dissolved in groundwater, sorbed to soil, or present as a separate phase), which is combusted via self-sustaining smoldering combustion to destroy the contaminant. In some embodiments, the organic treatment material itself is porous, and a separate porous matrix is not necessary. In other embodiments, the organic treatment material is mixed with a porous matrix such as sand or soil.

Embodiments of the present invention are based on using smoldering combustion to destroy or remove dissolved, sorbed, or separate phase contaminants below ground. Smoldering refers to combustion of a material at the surface of the solid or liquid material itself. For example, when a combustible material (e.g., tobacco) is compacted to form a porous solid (e.g., a cigarette) and is ignited, the oxidant (e.g., oxygen) diffuses into the surface of the material and the combustion proceeds at the surface of the tobacco leaf fragment. Smoldering is referred to as a heterogeneous combustion reaction because the oxidant (gas) and the fuel (liquid or solid) are distinct phases. This is in contrast to flaming combustion which is a homogeneous reaction occurring in a single (gas) phase.

The smoldering combustion process results in the generation of energy, water, and vaporous emissions, primarily carbon dioxide, carbon monoxide, and to a lesser extent volatile organic compounds and other compounds depending on the composition of the contaminants and solid material.

In embodiments of the present invention, the smolderable mixture serves as a scaffold to both entrap the contaminants that are to be treated and an environment that facilitates smoldering combustion. Smoldering combustion is maintained through the efficient recycling of energy within the system. First, the organic treatment material within the smolderable mixture, and/or the organic contaminants that are concentrated in the smolderable mixture is combusted, giving off heat energy which is retained by the porous matrix. Second, the retained heat energy is returned to the system from the porous matrix to pre-heat any other organic material within the smolderable mixture farther removed from the point in space where the combustion process was initiated. Thus, following a short duration energy input to initiate the process, smoldering combustion is self-sustaining (i.e., it uses the energy of the combusting organic materials—contaminants and/or organic treatment materials—along with a supply of oxidant, to maintain the reaction) and is capable of propagating away from the point of ignition through the smolderable mixture. Smoldering is the only type of combustion reaction that can propagate through an organic material/porous matrix mixture (i.e., flames are not capable of propagating through such a system). In a self-sustaining process, the heating source is terminated following the initiation of smoldering combustion.

The self-sustaining smoldering combustion process will also generate sufficient temperatures to destroy or remove organic contaminants that are within the smolderable mixture if the following conditions are met: (1) the organic material (contaminants and/or organic treatment materials) contains sufficient inherent energy to sustain a smoldering combustion process (i.e., it is a combustible material); (2) it is a porous matrix itself or is mixed with a porous matrix to enable the smoldering process; (3) a heat source is provided to initiate the process; and (4) at least one oxidant (e.g., oxygen, air) initiates and maintains the process.

The self-sustaining smoldering combustion treatment method applies to either solid or liquid organic materials and can be conducted in synthetic or natural porous medium or granular solid matrices.

Definitions. As used in this description and the accompanying claims, the following terms shall have the meanings indicated, unless the context otherwise requires.

As defined herein, the terms per- and polyfluoroalkyl substances are according to the definitions provided by R. C. Buck, et al., Perfluoroalkyl and Polyfluoroalkyl Substances in the Environment: Terminology, Classification, and Origins, 2011, Integrated Environmental Assessment and Management, Volume 7, Number 4, pg. 515.

The term "perfluoroalkyl substance" refers to an aliphatic substance for which all of the H atoms attached to C atoms in the nonfluorinated substance from which they are notationally derived have been replaced by F atoms, except those H atoms whose substitution would modify the nature of any functional groups present.

The term "polyfluoroalkyl substance" refers to an aliphatic substance for which all H atoms attached to at least one (but not all) C atoms have been replaced by F atoms, in such a manner that they contain the perfluoroalkyl moiety $C_nF_{2n+1}$—.

The term "PFAS" refers, collectively, to perfluoroalkyl substances and polyfluoroalkyl substances.

The term "porous matrix" refers to a synthetic or natural solid material having pores (open spaces) and wherein the solid material may be a single piece having pores or a collection of granular solids having pores there between. Examples of materials suitable of comprising the porous matrices of embodiments of the present invention include sand, gravel, glass beads, wood chips, zeolite, activated carbon, charcoal, soil, crushed stone, ceramic chips or beads, and combinations thereof. The porous matrix may be organic and therefore combustible or inorganic and not combustible.

The term "smoldering combustion" refers to the act or process of burning without flame; a rapid oxidation accompanied by heat and light but not flame. In smoldering combustion, the combustion occurs on the surface of the fuel (i.e., not in the gas phase above the fuel as with a flame), in this case, the organic material.

The term "organic material" refers either a liquid or a solid containing organic carbon compounds or combustible compounds.

The term "treatment material" refers to either a liquid or a solid compound that is emplaced in the subsurface to destroy, detoxify, collect or to provide a porous matrix to immobilize contaminants. Examples of treatment materials include: vegetable oil, hydrocarbons, tar, activated carbon, coal, charcoal, polymers, surfactants, sand, gravel, glass beads, wood chips, zeolite, soil, silt, fill, crushed stone, ceramic chips or beads, and combinations thereof. In some embodiments, the treatment materials may contain carbon or organic compounds. In some embodiments, the treatment material may be or may include combustible compounds that can be used as a fuel source for smoldering combustion to destroy or remove a subsurface contaminant. In some embodiments, the contaminant itself provides the fuel source for smoldering combustion. Treatment materials are not the contaminant being removed by the method.

The term "organic treatment material" refers to treatment materials comprising organic compounds, for example, vegetable oil, hydrocarbons, tar, activated carbon, coal, charcoal, polymers, surfactants, woodchips and combinations thereof. Some organic treatment materials provide both fuel and a porous matrix.

"Self-sustaining" refers to reaction conditions wherein smoldering combustion propagates through the organic material without the application of external energy; that is, when the already smoldering organic material produces sufficient heat to elevate the temperature in the adjacent material to its combustion point. Conditions may be self-sustaining even if initially the application of heat is required to initiate smoldering combustion.

The term "smolderable mixture" refers to any mixture of porous matrix, organic material, or conglomeration or aggregation of a porous matrix material that supports smoldering combustion.

The term "ignition" refers to the process of initiating smoldering combustion.

The term "conductive heating" refers to the transfer of thermal energy by direct physical contact.

The term "convective heating" refers to the transfer of thermal energy by the movement of fluids.

The term "radiative heating" refers to the transfer of thermal energy by electromagnetic radiation.

The term "PRB" means a permeable reactive barrier that allows groundwater to flow through it and can destroy, detoxify, collect or immobilize contaminants. Accordingly, the PRB may contain an organic treatment material. In some embodiments, the PRB may also perform the function of being used as a fuel source for smoldering combustion to destroy or remove a subsurface contaminant.

The porous matrix may be the organic material.

The smolderable mixture emplacement may be achieved manually, via backhoe or excavator, jetting, fracking, trenching, soil mixing or other methods.

Many organic treatment materials may be used as the fuel source for smoldering combustion by the methods disclosed herein. Examples of organic treatment materials for which the methods are particularly effective include hydrocarbon mixtures such as coal, activated carbon in all forms, shredded tires, wood, char and vegetable oils.

In embodiments of the invention, the following porous matrix materials have been found to form suitable admixtures with organic materials: sand, gravel, ceramic beads, porous metals, porous ceramics, coal, charcoal, activated carbon, and glass beads. These materials, if sized correctly, have a high surface area to volume ratio such that a sufficient amount of heat generated during the combustion process is transferred to and stored in the matrix material, so as to make the heat stored in the matrix material available to assist in further combustion of the organic material. The matrix material has further characteristics of sufficient pore space to receive organic material admixed therewith, and surface, shape, and sorting characteristics that are amenable to air flow through the pore spaces.

Ignition of smoldering combustion requires both a heating source to initiate combustion and a source of oxidant to initiate and maintain combustion.

FIG. 1 illustrates a PRB 11 containing a suitable mixture 12 located below ground 13 and at and below the water table 14. The PRB can be extended into the vadose zone 15 and be composed of contaminants, organic treatment material, and/or soils or other permeable construction material.

Figure 2:
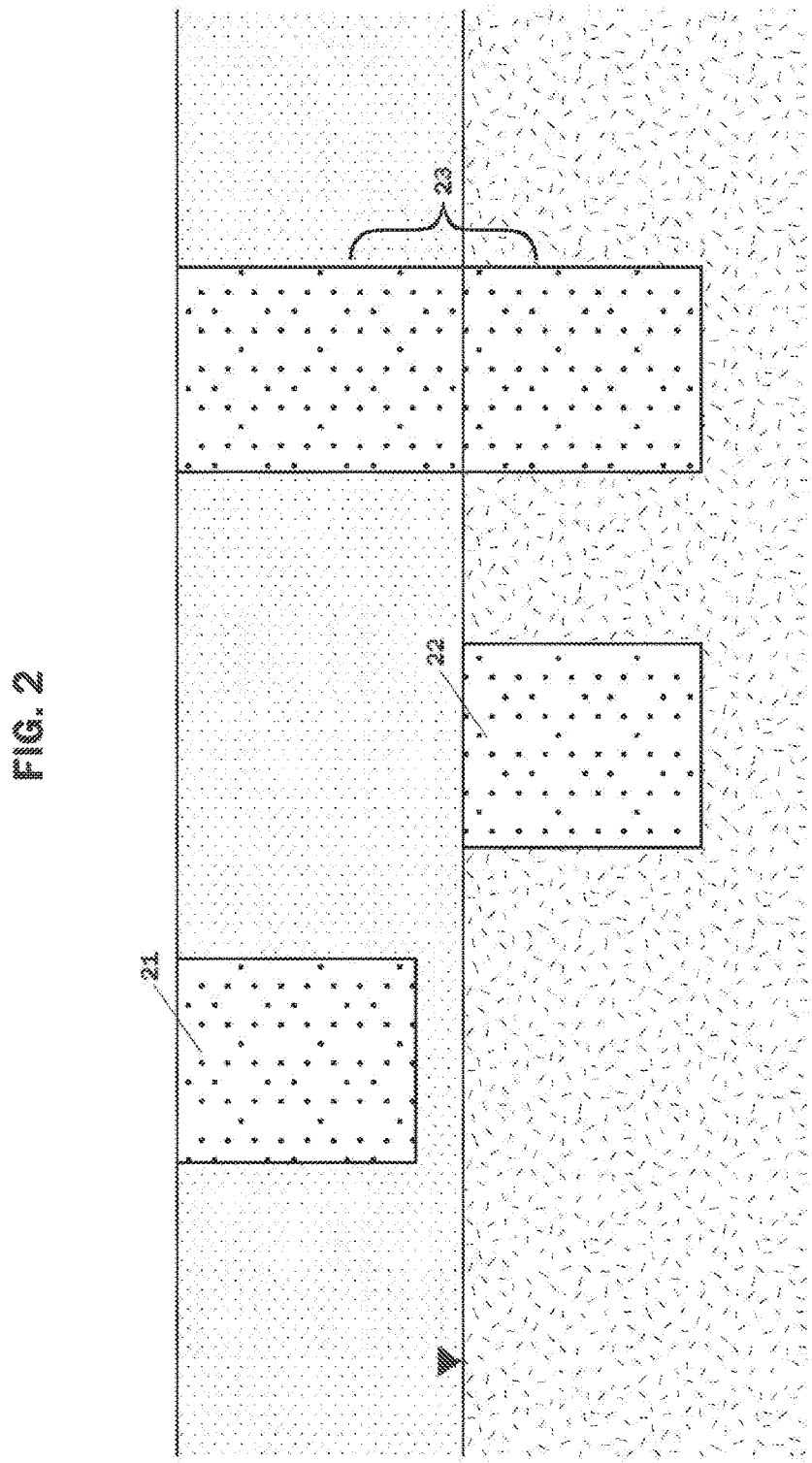
FIG. 2 is a schematic cross-sectional view of a volume of soil containing contaminants, organic treatment material and porous matrix material.

FIG. 2 illustrates that the suitable mixture can be emplaced in the vadose zone 21, below the water table 22 or from the surface into the water table 23.

Figure 3:
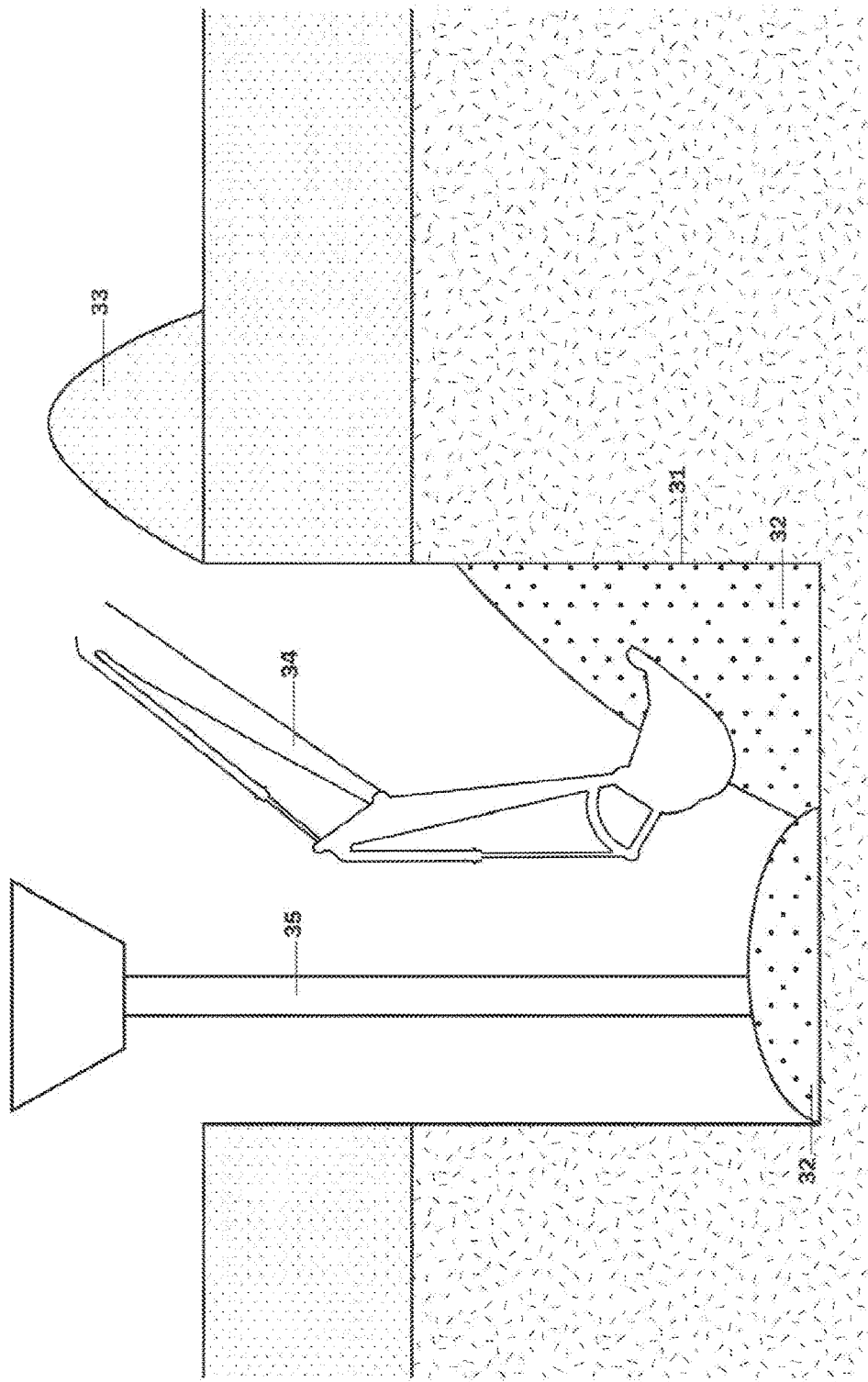
FIG. 3 is a schematic cross-sectional view of PRB being installed that is composed of a smolderable mixture by various trenching and excavation techniques.

FIG. 3 illustrates a method using excavation or trenching methods to make a PRB 31 composed of organic treatment material, and/or soils or other permeable construction material 32. The PRB may contain excavated soils 33. The PRB can be emplaced with equipment such as backhoe 34 and tremmie tube 35 methods.

Figure 4:
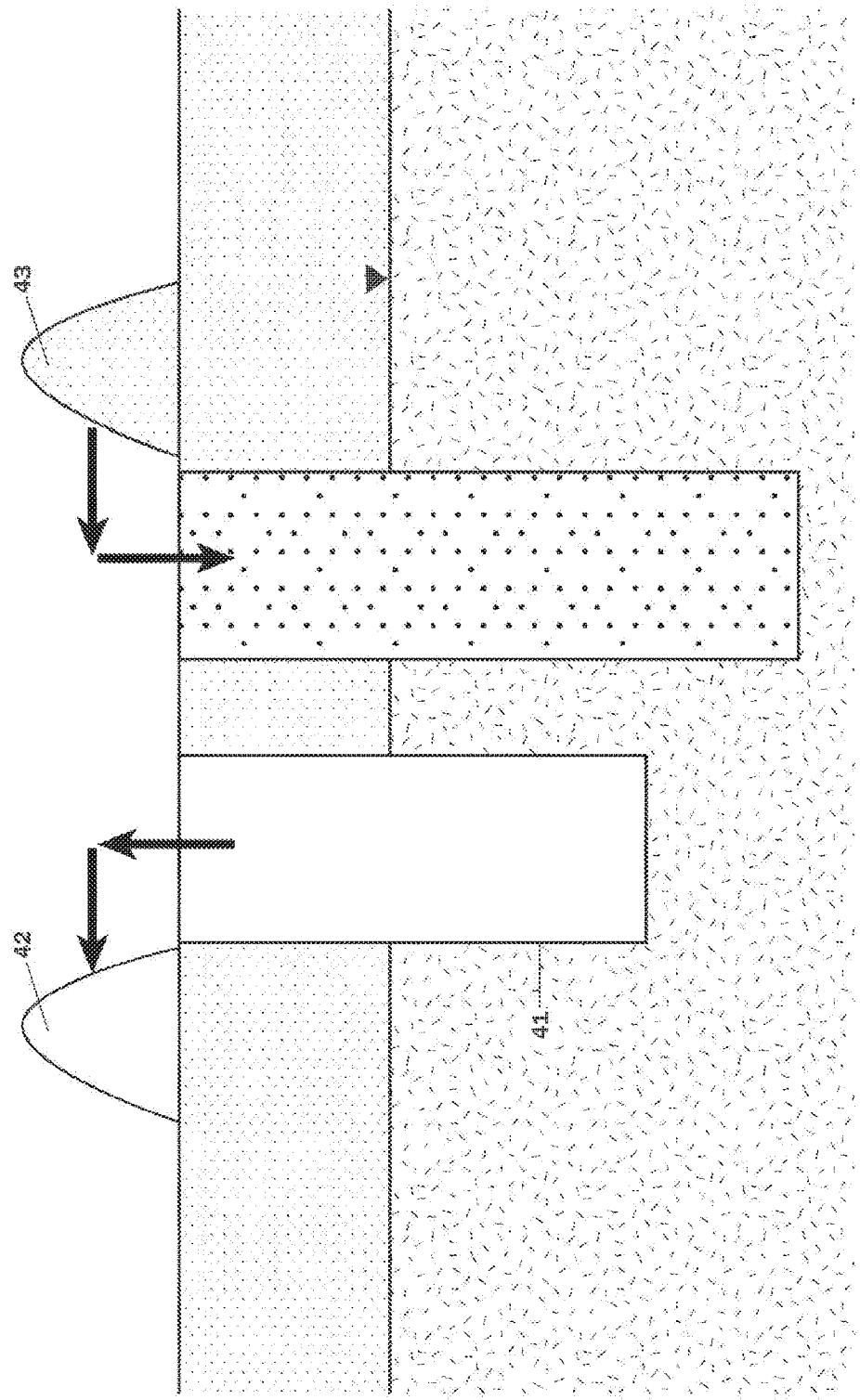
FIG. 4 is a schematic cross-sectional view of PRB being installed that is composed of a smolderable mixture by caisson techniques.

FIG. 4 illustrates the use of caisson methods to emplace a mixture of organic treatment material and/or soils or other permeable construction material. A caisson 41 is advanced to remove soil 42. The excavated soil is mixed with organic treatment material and/or other permeable construction materials to create a smolderable mixture 43 or a previously prepared smolderable mixture 43 is then used to fill the space in the caisson. The caissons can be discrete or overlapped to create a continuous zone comprised of the suitable mixture.

Figure 5:
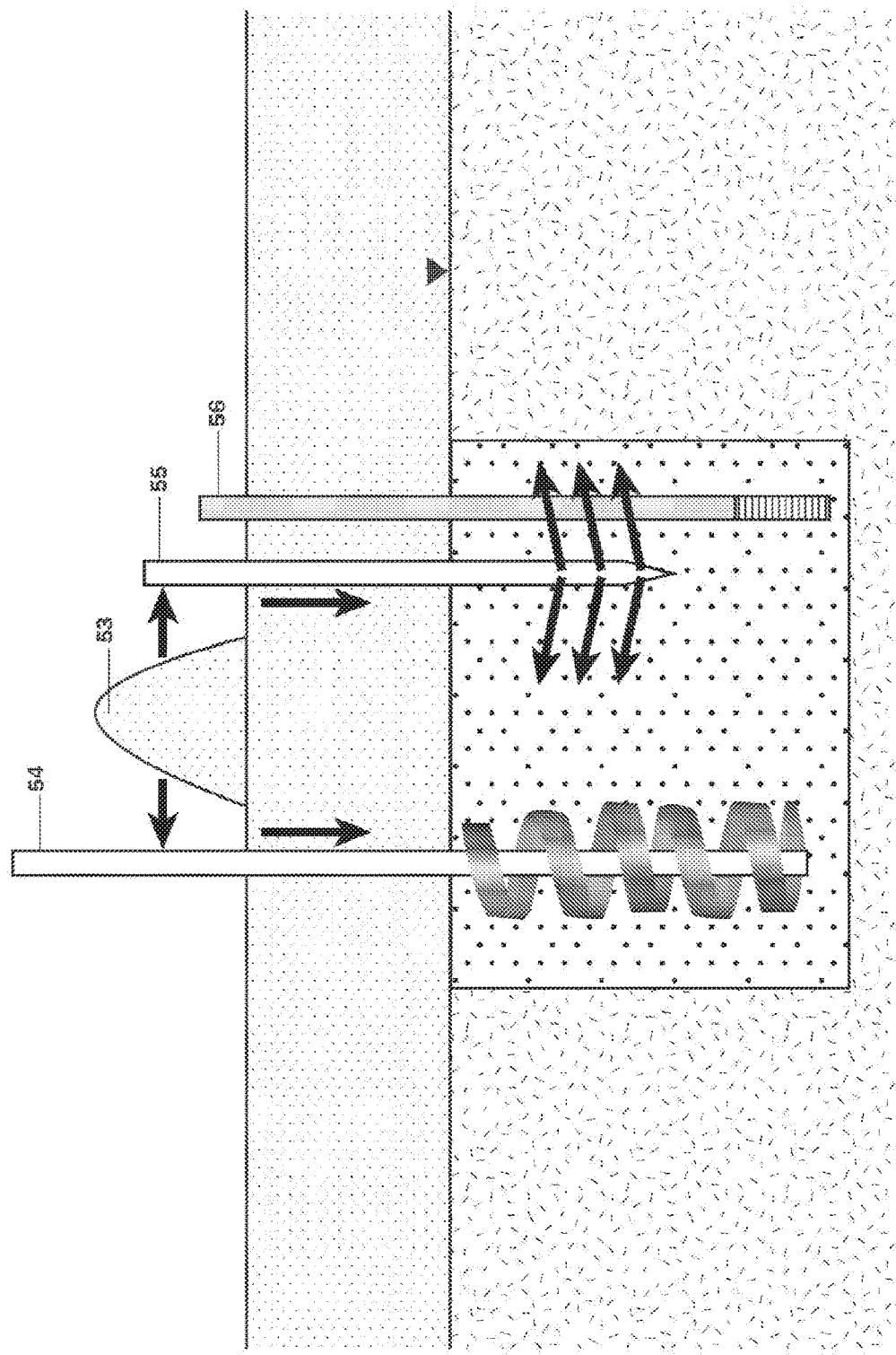
FIG. 5 is a schematic cross-sectional view of a PRB being installed that is composed of a smolderable mixture by jetting or fracking techniques or use of mixing tools.

FIG. 5 illustrates the use of soil mixing 54, jetting methods 55, or injection methods 56 to add a smolderable mixture 53 to create a PRB.

Figure 6:
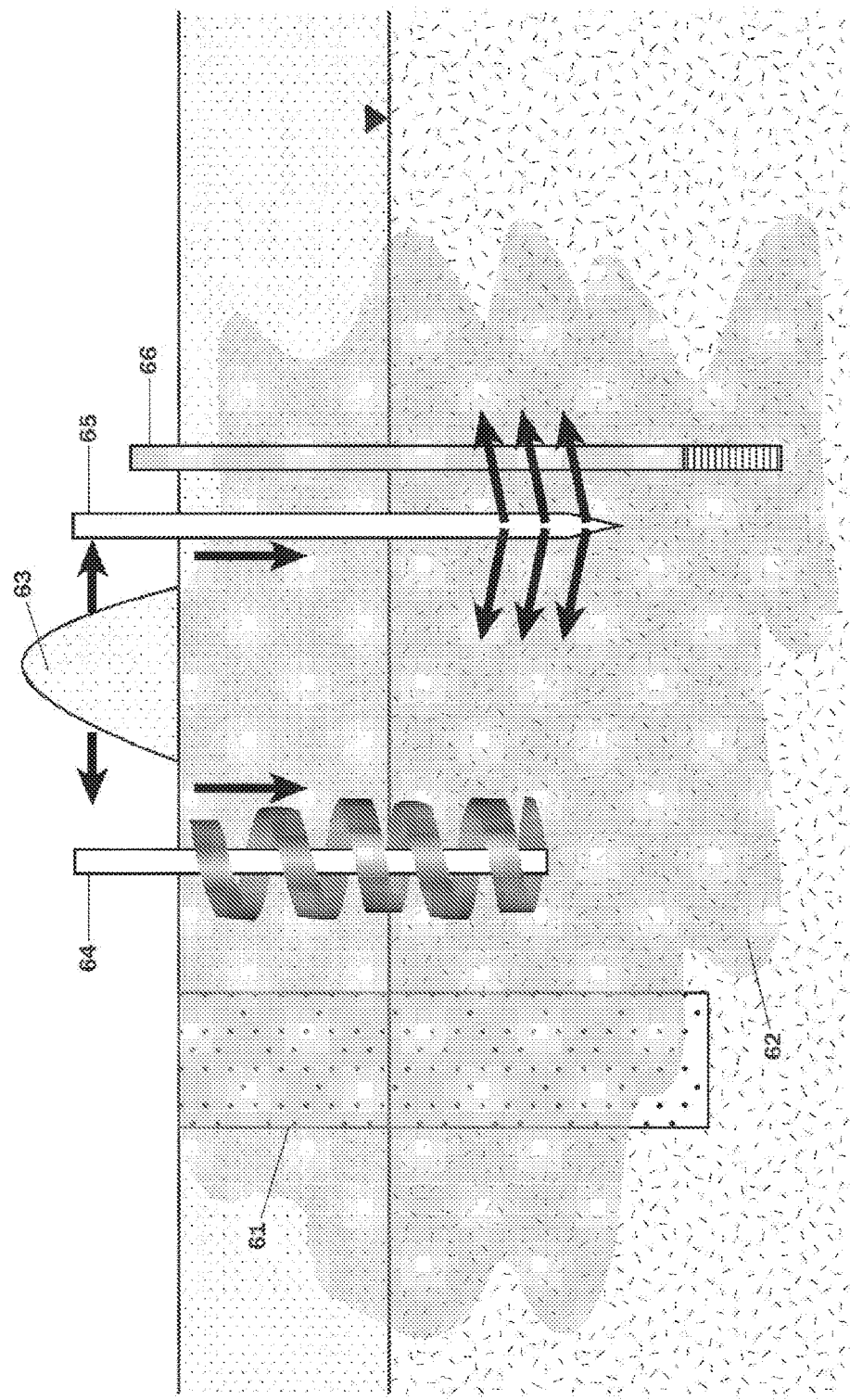
FIG. 6 is a schematic cross-sectional view of a soil mixing technique being used to install a smoldering mixture into a volume of soils containing contaminants.

FIG. 6 illustrates the use of soil mixing 64, jetting methods 65 or injection methods 66 to mix organic treatment material 63, and/or soils or other permeable construction material into a volume of soil containing the contaminants 62. FIG. 6 also shows a mixture 61 having been mixed into the contaminated materials (wherein the mixture may have been formed from the methods shown in FIG. 5).

Figure 7:
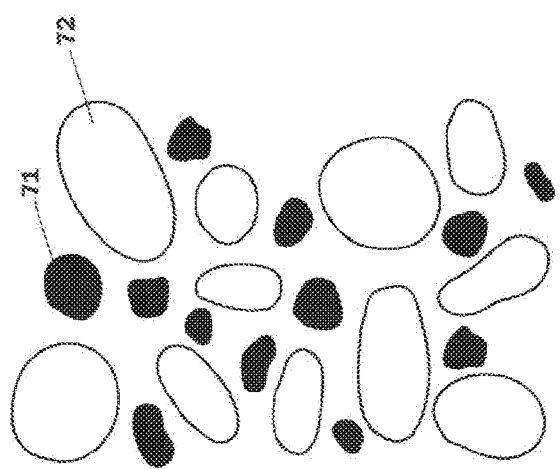
FIG. 7 is an enlarged schematic view of a smolderable mixture according to embodiments of the invention.

FIG. 7 illustrates a suitable mixture composed of organic treatment materials 71 within a porous matrix 72, and the pore space of the suitable mixture may contain air or water, or organic contaminants in any proportion.

Figure 8:
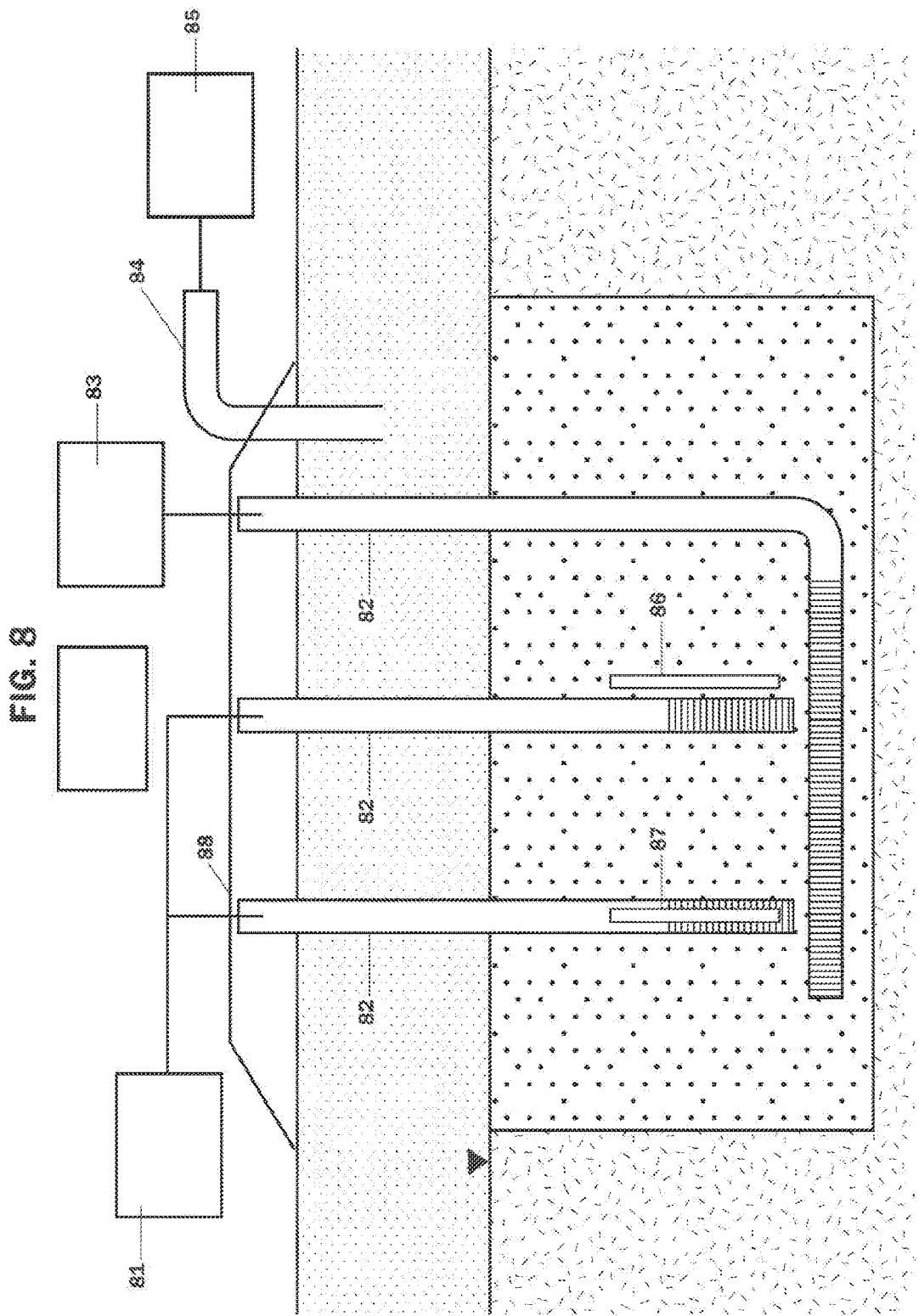
FIG. 8 is a schematic cross-section of a PRB containing a smolderable mixture undergoing a treatment by smoldering combustion comprising an oxidant source and heating elements.

FIG. 8 illustrates the application of smoldering combustion to treat contaminants in a PRB. Oxidant is supplied to the PRB from an oxidant source 81 through injection points that may be vertical or horizontal 82 located within the PRB. The air injection points may comprise a single aperture into the PRB or may have multiple points placed within the PRB. Various heating sources (e.g., conductive, convective, inductive, or radiative) may be used either alone or in combination for ignition of smoldering combustion. For example, a heating source 83 may be placed in-line with the supplied oxidant to supply heat to the suitable mixture. Heating sources 86 may also be positioned within the PRB. Additionally, an internal heating source 87 may be placed within the air supply port. The heating element may be an electrically-powered cable heater, electrically-powered cartridge heater, electro-magnetically activated heating system, or radiative tube heater in which propane or other external fuel source is internally supplied and combusted. Vapors and products of the combustion reaction can be collected from the PRB with a vapor collection system that collects vapors below ground 84 or above ground 88 and routed for treatment by means of a routing system 85 or released to the atmosphere.

Figure 9:
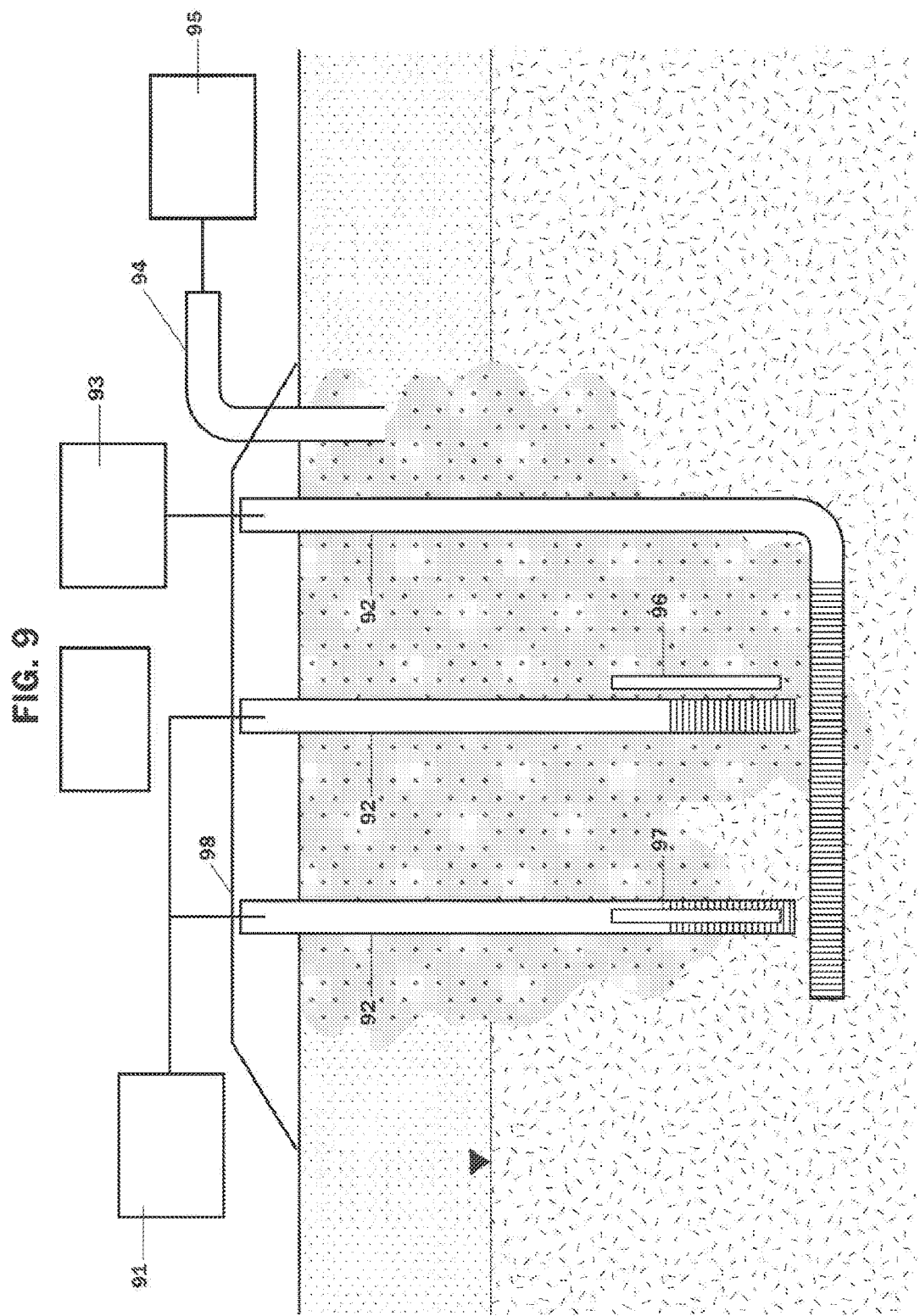
FIG. 9 is a cross-sectional schematic of a contaminated volume of soil containing a smolderable mixture undergoing treatment by smoldering combustion comprising an oxidant source and heating elements

FIG. 9 illustrates the application of smoldering combustion to treat a volume of soil containing contaminants, organic treatment material, and/or soils or other permeable construction material. Oxidant is supplied to the PRB from an oxidant source 91 through an injection points that may be vertical or horizontal 92 located within the PRB. The air injection points may comprise a single aperture into the PRB or may have multiple points placed within the PRB. Various heating sources (e.g., conductive, convective, inductive, or radiative) may be used either alone or in combination for ignition of smoldering combustion. For example, a heating source 93 may be placed in-line with the supplied oxidant to supply heat to the suitable mixture. Heating sources may also be positioned within the volume of soil containing contaminants 96. Additionally, an internal heating source may be placed within the air supply port 97. The heating element may be an electrically-powered cable heater, electrically-powered cartridge heater, electro-magnetically activated heating system, or radiative tube heater in which propane or other external fuel source is internally supplied and combusted. Vapors and products of the combustion reaction can be collected from the PRB with a vapor collection system that collects vapors below ground 94 or above ground 98 and routed for treatment 95 or released to the atmosphere.

Figure 10:
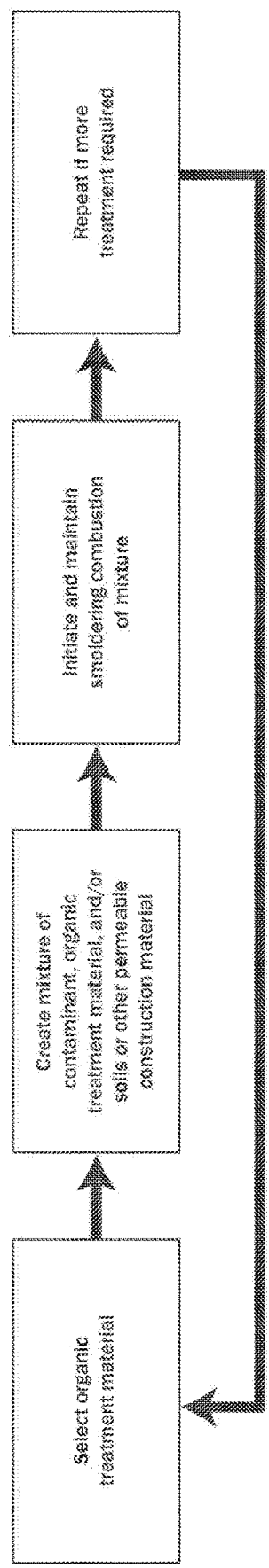
FIG. 10 is a flow diagram illustrating particular steps according to the embodiments of the invention.

FIG. 10 illustrates the key steps in the invention. As shown in the figure, an organic treatment material is first selected. This step is followed by a mixing step wherein the contaminant is mixed with the organic treatment material and/or soils or other permeable construction material. Smoldering combustion is then initiated and maintained. If more treatment is needed, additional organic treatment material can be selected and the steps repeated as per the figure.

The air supply points may be perforated plates, screens, perforated carbon-steel, stainless-steel or other material rods, carbon-steel, stainless-steel or other material wells with wire-wrapped or slotted screens installed within the vessel. The heating elements may be electrical resistive heaters or radiative heaters installed or placed within or adjacent to the air supply ports, installed in or adjacent to the mixture surrounding the supply ports, or an element heating air passing through the supply ports and into the mixture.

In particular embodiments, the oxidant is oxygen supplied as a component of atmospheric air. The reaction is controllable such that terminating the supply of oxygen to the reaction front terminates the reaction. Increasing or decreasing the rate of oxygen flux to the reaction front will also increase or decrease the rate of combustion and, therefore, the propagation rate of the reaction front, respectively. Also, the air supply can be enriched with additional oxygen to increase the oxygen content of the air supplied.

It should be appreciated that combustion can be monitored according to methods known to those of skill in art to determine the amounts of oxygen, air or other oxidant required to maintain smoldering combustion. Combustion temperatures are commonly monitored with thermocouples which can be placed throughout the volume of material being combusted.

Combustion gases and other compounds produced by the process are collected at the outlet vapor collection points above or at the surface of the PRB or volume of soils containing the contaminants.

The air supply points may be spaced according to the overall dimensions of the volume of soil containing the contaminants or the PRB so that oxidant is delivered in sufficient quantity and at a sufficient rate throughout the volume of soil containing the contaminants or the PRB; thereby facilitating smoldering combustion throughout the volume of soil containing contaminants or the PRB.

The embodiments of the invention described above are intended to be merely exemplary; numerous variations and modifications will be apparent to those skilled in the art. All such variations and modifications are intended to be within the scope of the present invention as defined in any appended claims.

EXAMPLES

The following examples relate specifically to experiments addressing the remediation of PFAS contaminants using smoldering combustion. These experiments were performed with funding from the Strategic Environmental Research and Development Program (SERDP), Project Number ER18-1593. The final report from this project is incorporated herein by reference (Final Report, SERDP Project number ER18-1593).

The temperatures obtained through smoldering can be significant, and exceed temperatures needed to destroy PFAS. However, unlike solid or liquid fuels, PFAS are not contaminants that can support smoldering combustion in and of themselves. Example 1 evaluates the ability of two specific organic treatment materials to act as fuel to support the high temperature smoldering process (greater than 900° C.) sufficient to destroy PFAS. The two organic treatment materials examined were granular activated charcoal (GAC) and crumb rubber. Both GAC and crumb rubber were found to work as organic treatment materials for PFAS destruction. Example 2 assesses PFAS destruction during smoldering combustion using GAC as an organic treatment material.

Example 1: Testing of Organic Treatment Materials

The purpose of this Example was to determine a fuel (i.e. organic treatment material) and fuel ratio that would achieve temperature sufficient to destroy PFAS. During these tests, fuel, ratio of fuel to sand, and air flux were varied to understand the relationships between these parameters and the resulting temperatures recorded during smoldering tests. For these tests, two fuels were identified as potential organic treatment materials: granular activated carbon (GAC) and crumb rubber.

Column Test Setup

Laboratory tests used a stainless-steel column that had a diameter of 16 cm and a height of 60 cm. The smoldering column was placed in a walk-in fume hood on a scale which recorded the mass loss in real-time. A coiled resistive heater (450 W, 120 V, Watlow Ltd.) was located at the base of the column and was connected to a single-phase variable power supply (120 V, STACO Energy Products). The air supply was connected at the base of the column; a layer of coarse and medium sand was placed above the air supply to evenly distribute the airflow throughout the cross-section of the column. Thermocouples were inserted horizontally at 3.5 cm increments vertically up the column and measured temperatures at the center of the column. The first and second thermocouples were placed just below and above the heater. The stainless-steel column was wrapped with insulation (5 cm thick mineral wool, part number 9364K62, McMaster-Carr, Aurora, Ohio) to minimize heat losses. Gas emissions were analyzed for volume fractions of oxygen, carbon monoxide, and carbon dioxide using a gas analyzer. During tests, a data logger and personal computer recorded the mass loss, thermocouple, and gas analyzer data. Measurements were taken approximately every two seconds.

Preparing the Smoldering Organic Treatment Material and Sand Mixture

The stainless-steel column was packed with approximately 25 cm of coarse silica sand and GAC or crumb rubber (mesh 10-20, Emterra). The GAC or crumb rubber and coarse silica sand were mixed at predetermined ratios for the test, using a KitchenAid mixer (Professional 600™) to create a uniform mixture. Two batches of approximately 4 kg each were required to create a 25 cm pack height in the smoldering column. 14 cm of coarse sand was added into the column above the fuel and sand mixture to allow for cooling.

Smoldering Procedure

The heater was turned on to begin pre-heating. Once the second thermocouple reached 260° C., air was introduced into the bottom of the column using a mass flow controller (FMA5400/5500 Series, Omega Ltd.). The heater was turned off when the third thermocouple peaked. Self-sustaining smoldering was then shown by the consecutive consistent peak temperatures exhibited by the thermocouples in the fuel and sand mixture. The self-sustaining smoldering continued until the front reached the clean sand layer; at this time, the temperatures began to decrease.

Results and Discussion

Table 1 presents a summary of eight tests conducted with GAC and crumb rubber. Although crumb rubber (test 1-2) supported self-sustained smoldering, it produced emissions with aerosol droplets (condensates) that made it not a suitable candidate for further testing.

TABLE 1

Test Summary

| Test No | Ratio (g fuel/kg sand) | Fuel | Air Flux (cm/s) | Moisture Content (%) | Average Peak Temp. (° C.) | Average Front Velocity (cm/min) | Smoldering Temperature Trend | Self-Sustaining |
|---|---|---|---|---|---|---|---|---|
| 1-1 | 60 | GAC | 5 | 0 | 1253 | 0.64 | Steady | Yes |
| 1-2 | 60 | Crumb Rubber | 5 | 0 | 720 | 0.64 | Increasing | Yes |
| 1-3 | 40 | GAC | 5 | 0 | 990 | 0.66 | Increasing | Yes |
| 1-4 | 20 | GAC | 5 | 0 | 690 | 0.49 | Steady | Yes |
| 1-5 | 40 | GAC | 2.5 | 0 | 1003 | 0.47 | Steady | Yes |
| 1-6 | 40 | GAC | 7.5 | 0 | 1044 | 0.7 | Steady | Yes |
| 1-7 | 60 | GAC | 2.5 | 0 | 1153 | 0.39 | Steady | Yes |
| 1-8 | 20 | GAC | 2.5 | 0 | 661 | 0.33 | Steady | Yes |

Analysis of these data demonstrate that the peak temperature is controlled in an approximately linear relationship by the GAC concentration. There is minimal influence on peak temperature by air flux. Conversely, the front velocity is controlled, again in an approximately linear fashion by air flux.

These results support the conclusion that there is an energy balance that is dominated by the rate of oxidation and heat release and heat loss. As the fuel content increases of a given fuel, there is more energy that can be released per unit time if oxygen is in excess to the available fuel. This results in higher average peak temperatures. Increasing the air flux increases the rate of forward convective heat transfer and that results in a faster front velocity (faster mass rate of destruction) at a given GAC concentration.

The GAC experiments demonstrate that:
1. GAC mixed with soil can achieve temperatures greater than 1000° C.;
2. Moderate temperatures (260° C.) can be used to initiate the reaction (low energy requirements); and
3. Duration of treatment is relatively short based on achievable front velocity.

Example 2: Assessment of PFAS Destruction Methodology

Test results from Example 1 indicated GAC would be an ideal fuel to use because it would allow temperatures of over 900° C. to be achieved during self-sustaining smoldering. The tests of Example 2 were performed to examine the fate of added PFAS during smoldering. Example 2 comprises two tests using PFAS contaminated GAC and two using PFAS contaminated soil. The PFAS compounds used were perfluorooctanoic acid (PFOA), perfluorooctanesulfonic acid (PFOS), perfluorohexanesulfonic acid (PFHxS), perfluorononanoic acid (PFNA), perfluorobutanesulfonic acid (PFBS), and perfluoroheptanoic acid (PFHpA).

Sample Preparation

As shown in Table 2, stock solutions were prepared for tests 2-1 to 2-3 that used three PFAS compounds (PFOA, PFOS, PFHxS), and test 2-4 used six PFAS compounds (PFOA, PFOS, PFHxS, PFNA, PFBS, and PFHpA).

TABLE 2

Amount of PFAS Compound Used for Stock Solutions

| Test Number | PFOA (g) | PFOS (g) | PFHxS (g) | PFNA (g) | PFBS (g) | PFHpA (g) |
|---|---|---|---|---|---|---|
| 2-1 | 0.6460 | 0.0988 | 0.2660 | — | — | — |
| 2-2 | 0.6460 | 0.0988 | 0.2660 | — | — | — |
| 2-3 | 10.2 | 1.56 | 4.2 | — | — | — |
| 2-4 | 5.1 | 0.78 | 2.1 | 5.1 | 0.516 | 5.1 |

For tests 2-1 and 2-2, GAC was added to each of the stock solution bottles. The bottles were placed on a shaker table for four days at 170 rpm. Each bottle was drained under vacuum through a 12.5 cm, coarse filter paper (09-790-12E, Fisher Scientific). The GAC was then placed in a covered polypropylene container. This was completed for each of the 12 bottles.

For tests 2-3 to 2-4, topsoil was dried in the oven at 105° C. for 24 hours, crushed using a mortar and pestle, and then sieved using a standard set of sieves and the mechanical sieve shaker. Grains larger than sieve #10 were removed from the soil. Remaining soil was then blended to create a homogenized mixture.

Dried topsoil was added to the stock solution. The carboy was shaken periodically over four days to re-suspend the soil and maximize the sorption of PFAS to the soil. Silicone tubing and a peristaltic pump were used to remove the soil and stock solution from the carboy. If drained soil still contained significant free water, it was placed as a thin layer in a tray until the moisture content decreased to less than 20%. After this, the lid was placed on the container to keep residual water in the soil. Moisture content was determined following the ASTM Standard D2974-14, *Standard Test Methods for Moisture, Ash, and Organic Matter of Peat and Other Organic Soils.*

Smoldering Experiments

The experimental procedure for the smoldering column tests was the same as described in Example 1. Table 3 provides the experimental parameters for the four tests performed.

TABLE 3

Fuel, Fuel Ratio and Air Flux Used for Assessment of PFAS Destruction

| Test Number | Fuel | Porous Media | Ratio (g fuel/kg sand or soil) | Air Flux (cm/s) |
|---|---|---|---|---|
| 2-1 | GAC (with 3 PFAS) | Sand | 43 | 5.0 |
| 2-2 | GAC (with 3 PFAS) | Sand | 39 | 5.0 |
| 2-3 | GAC | Soil (with 3 PFAS) | 48 | 5.0 |
| 2-4 | GAC | Soil (with 6 PFAS) | 48 | 5.0 |

For tests 2-1 and 2-2, the same procedure was followed to prepare the smoldering fuel and sand mixture as described in Example 1. For tests 2-3 to 2-4 the same procedure was used; however, the coarse silica sand was replaced with a mixture of 28% topsoil, 47% medium sand, and 25% coarse sand. For these measurements, the dry weight of the topsoil was used to create a soil mixture which would represent common field soils.

The same procedure was used to conduct smoldering tests as described in Example 1. However, for these tests, additional emission collection systems were setup to monitor for PFAS emissions.

Results and Discussion

Sand Treatment

The objective of test 2-1 and 2-2 was to assess if three target PFAS (PFOA, PFOS and PFHxS), could be destroyed when adsorbed onto GAC that is then mixed with sand. Stock solutions of these three compounds were made for each test and the amount of PFAS absorbed from each stock solution by the GAC is presented in Table 4.

TABLE 4

PFAS Concentration in Stock Solution Before and After GAC Addition

| PFAS Compound | Test 2-1 | | Test 2-2 | |
|---|---|---|---|---|
| | Before GAC | After GAC | Before GAC | After GAC |
| PFOA | 530 | <0.2 | 551 | 0.083 |
| PFOS | 127 | <0.2 | 133 | 0.046 |
| PFHxS | 215 | <0.2 | 241 | 0.025 |

All values in mg/L

The results indicate that GAC removed >99% of the PFAS in the stock solutions. The difference in PFAS concentration in the stock solution before and after GAC addition was used to calculate the total mass absorbed to the GAC and in the columns based on the amount of GAC used.

Table 5 presents the smoldering summary for both tests. The GAC to sand ratio was adjusted to reflect the moisture content of the GAC.

TABLE 5

Smoldering Summary for Test 2-1 & 2-2

| Test No. | Ratio (g GAC/kg sand) | Air Flux (cm/s) | Moisture Content (%) | Avg. Peak Temp (° C.) | Avg. Front Velocity (cm/min) | Avg. O$_2$ (%) | Temp. Trend | Self-Sustaining |
|---|---|---|---|---|---|---|---|---|
| 2-1 | 43 | 5 | 14 | 908 | 0.69 | 5 | Steady | Yes |
| 2-2 | 39 | 5 | 21 | 950 | 0.68 | 6 | Steady | Yes |

Based on these results, the moisture content reduces the average peak temperature slightly, but otherwise has little impact on front velocity.

Table 6 shows the pre- and post-analytical results and indicates that no PFAS compounds were present within detection limits (D.L.) in the sand and ash after treatment.

TABLE 6

Pre and Post PFAS Concentrations

| PFAS | Test 2-1 | | Test 2-2 | |
|---|---|---|---|---|
| | Pre | Post | Pre | Post |
| PFOA | 590,000 | <0.4 | 510,000 | <0.4 |
| PFOS | 140,000 | <0.4 | 120,000 | <0.4 |
| PFHxS | 240,000 | <0.4 | 220,000 | <0.4 |

All Results in ug/kg
D.L. 0.4 ug/kg

Soil Treatment

Surrogate soil comprising a mixture of topsoil, medium silica sand (20-30 mesh) and coarse silica sand (16 mesh) was used in tests 2-3 and 2-4. Test 2-3 used a mixture of 30% topsoil, 45% medium sand and 25% coarse sand, whereas test 2-4 used a mixture of 23% topsoil, 47% medium sand and 25% coarse sand. Test 2-3 used the same three PFAS used in tests 2-1 and test 2-2, and test 2-4 included three additional PFAS: PFNA, PFBS and PFHpA. The objective of these tests was to assess the treatment of PFAS that was adsorbed to the soil, and the use of GAC to create smoldering conditions to support their destruction. In addition, these tests further evaluated gas emissions for breakdown byproducts and degree of PFAS destruction. The GAC ratio was targeted at 50 g/kg soil to achieve temperatures greater than 1000° C. as observed in Phase I tests.

Table 7 presents a summary of the smoldering data for tests 2-3 and 2-4 and includes the moisture content and initial GAC composition. The results indicate that a self-sustaining reaction was obtained with temperatures in excess of 1000° C. Tables 8 and 9 show the analytical data for tests 2-3 and 2-4, respectively, and demonstrate almost complete removal of all added PFAS.

TABLE 7

Smoldering Summary

| Test | GAC (g/kg) | Air Flux (cm/s) | M.C. (%) | Avg. Peak Temp. (° C.) | Avg. Front Vel. (cm/min) | Avg. $O_2$ (%) | Temp. Trend | Self-Sustaining |
|---|---|---|---|---|---|---|---|---|
| 2-3 | 48 | 5 | 10.8 | 1016 | 0.63 | 5 | Steady | Yes |
| 2-4 | 50 | 5 | 5.7 | 1064 | 0.72 | 6 | Steady | Yes |

TABLE 8

Test 2-3 Soil Analytical Results

| Sample | PFAS (mg/kg) | | |
|---|---|---|---|
|  | PFHxS | PFOA | PFOS |
| Blank Soil | N.D. | N.D. | N.D. |
| PFAS Loaded Soil | 16.86 | 13.41 | 23.3 |
| Loaded Soil with Sand & GAC | 7.06 | 6.14 | 9.54 |
| Post-Treatment Ash/Soil | N.D. | N.D.* | N.D. |

Notes
*2 of 3 samples were non-detect for all 3 PFAS compounds. 1 sample had a measured PFOA concentration of 0.0002 mg/kg.
N.D. = not detected at Detection Limit of 0.00005 mg/kg

TABLE 9

Test 2-4 Soil Analytical Results

| Sample | PFAS (mg/kg) | | | | | |
|---|---|---|---|---|---|---|
|  | PFBS | PFHpA | PFHxS | PFOA | PFNA | PFOS |
| Blank Soil | N.D. | N.D. | N.D. | N.D. | N.D. | N.D. |
| PFAS Loaded Soil | 3.19 | 13.32 | 10.84 | 14.91 | 28.73 | 10.87 |
| Loaded Soil with Soil & GAC | 1.3 | 9.75 | 7.21 | 11.49 | 25.58 | 6.67 |
| Post-Treatment Ash/Soil | N.D. | N.D. | N.D. | N.D. | N.D. | N.D. |

N.D. = not detected at Detection Limit of 0.0005 mg/kg

Based on Examples 1 and 2 it may be concluded that:

1. GAC can be used to support smoldering combustion to achieve temperatures that destroy PFAS when added to soils at 40 to 60 g/kg.
2. PFAS absorbed to GAC or soils can be treated via smoldering combustion resulting in non-detectable levels in soils, sand and ash.
3. GAC smoldering can be initiated with low heat (260° C.) over short time periods, and the smoldering front velocity is sufficiently fast to be practicable at larger scales.

What is claimed is:

1. A method for remediating contaminated soil and groundwater, the method comprising:
   selecting a treatment material;
   creating a smolderable mixture of contaminant, treatment material and soils, wherein the smolderable mixture is part a permeable reactive barrier that intersects the groundwater containing the contaminants, the permeable reactive barrier configured to absorb and concentrate contaminant from the groundwater as it flows through the permeable reactive barrier;
   allowing the smolderable mixture to absorb and concentrate contaminant from the groundwater;
   heating a portion of the smolderable mixture;
   forcing oxidant through the smolderable mixture;
   initiating a self-sustaining smoldering combustion of the smolderable mixture to destroy or remove the contaminant; and
   terminating the source of heat applied to the smolderable mixture.

2. A method according to claim 1, further comprising propagating the combustion away from the point of ignition of the combustion.

3. A method according to claim 1, wherein the contaminant is selected from a group consisting of perfluoroalkyl substances, polyfluoroalkyl substances, dioxins, polychlorinated biphenyl compounds, pesticides, herbicides, volatile organic compounds (VOCs), and semi-volatile organic compounds (SVOCs), and combinations thereof.

4. A method according to claim 1, wherein the treatment material is selected from the group consisting of vegetable oil, hydrocarbons, tar, activated carbon, coal, charcoal, polymers, surfactants, sand, soils, silt, loam, fill, cobbles, gravel, crushed stone, glass, ceramics, zeolite, woodchips and combinations thereof.

5. A method according to claim 1, wherein the soil contains the contaminants, and wherein the soil containing the contaminants is mixed with the treatment material to create a smolderable mixture.

6. A method according to claim 1, wherein the treatment material is admixed below the ground using a variety of methods selected from the group consisting of trenching, large diameter auger, excavation, caisson, injection, jetting, fracking, vibrating beam, tremmie, soil mixing and combinations thereof.

7. A method according to claim 1, wherein the smolderable mixture is combusted in place.

8. A method according to claim 1, wherein the smolderable mixture is removed and combusted above the ground.

9. A method according to claim 1, wherein the smolderable mixture is created and combusted above the ground.

10. A method according claim 1, wherein forcing oxidant through the smolderable mixture includes injecting air into the smolderable mixture through an injection port.

11. A method according to claim 1, wherein initiating self-sustaining smoldering combustion includes applying heat to the smolderable mixture from at least one internal conductive heating source in direct contact with the smolderable mixture.

12. A method according to claim 1, wherein initiating self-sustaining smoldering combustion includes applying heat to the smolderable mixture from at least one convective heating source coupled to the smolderable mixture.

13. A method according to claim 12, wherein at least one convective heating source is external to the smolderable mixture.

14. A method according to claim 12, wherein at least one convective heating source is located within the smolderable mixture.

15. A method according to claim 1, wherein initiating smoldering combustion includes applying radiative heat to the smolderable mixture.

16. A method according to claim 1, wherein forcing oxidant through the smolderable mixture includes injecting air into the smolderable mixture through a plurality of injection ports.

17. A method according to claim 1, wherein forcing oxidant through the smolderable mixture includes creating a vacuum to suck oxidant through the smolderable mixture.

18. A method according to claim 1, further comprising performing the smoldering combustion at a temperature within a range between 200 and 2000 degrees Celsius.

19. A method according to claim 1, further comprising forcing oxidant through the smolderable mixture at a linear velocity of between 0.0001 and 100 centimetres per second.

20. A method according to claim 1, wherein the treatment material is a liquid.

21. A method according to claim 1, wherein the treatment material is a slurry.

22. A method according to claim 1, wherein the treatment material is a solid.

* * * * *